US011949365B2

(12) United States Patent
Materna et al.

(10) Patent No.: US 11,949,365 B2
(45) Date of Patent: Apr. 2, 2024

(54) SOLAR MOUNTING SYSTEM FOR A SHIPPING CONTAINER

(71) Applicant: GIVEPOWER FOUNDATION, Austin, TX (US)

(72) Inventors: Benjamin Materna, Lotus, CA (US); Theresa Sweeney, Charlottesville, VA (US); Kyle Stephan, Escondido, CA (US)

(73) Assignee: GIVEPOWER FOUNDATION, Austin, TX (US)

( * ) Notice: Subject to any disclaimer, the term of this patent is extended or adjusted under 35 U.S.C. 154(b) by 0 days.

(21) Appl. No.: 18/119,008

(22) Filed: Mar. 8, 2023

(65) Prior Publication Data

US 2023/0291346 A1    Sep. 14, 2023

Related U.S. Application Data

(60) Provisional application No. 63/318,314, filed on Mar. 9, 2022.

(51) Int. Cl.
*H02S 10/40* (2014.01)
*H02S 20/30* (2014.01)
(Continued)

(52) U.S. Cl.
CPC .............. *H02S 10/40* (2014.12); *H02S 20/30* (2014.12); *E04H 2001/1283* (2013.01);
(Continued)

(58) Field of Classification Search
CPC .......... H02S 10/40; H02S 20/30; H02S 20/00; H02S 20/23; H02S 30/00; H02S 20/10;
(Continued)

(56) References Cited

U.S. PATENT DOCUMENTS

2011/0146751 A1* 6/2011 McGuire ................. F03D 9/007
136/245
2016/0352285 A1* 12/2016 Seery ...................... H02S 30/20
(Continued)

FOREIGN PATENT DOCUMENTS

WO    2018209378 A1    11/2018
WO    2021246993 A1    12/2021

OTHER PUBLICATIONS

United States International Searching Authority, International Search Report and Written Opinion for corresponding International Application No. PCT/US2023/014804, dated Jul. 6, 2023, 10 pages.

*Primary Examiner* — Michael Y Sun
(74) *Attorney, Agent, or Firm* — David R. Heckadon; Gordon Rees Scully Mansukhani LLP

(57) ABSTRACT

A solar mounting system stored within a shipping container prior to deployment and wherein the mounting system includes: laterally extending beams that extend outwardly from the top of the shipping container; support mounts connected to the laterally extending beams at positions over the top of the shipping container and at the ends of the laterally extending beams; a first set of higher longitudinal beams spanning between the support mounts; a second set of lower longitudinal beams spanning between ends of the laterally extending beams at positions beside the shipping container; a plurality of PV module support rails extending between the first and second sets of longitudinal beams; and PV modules mounted onto the PV module support rails such that the PV modules slope downwardly from above the center to beyond the sides of the shipping container.

18 Claims, 15 Drawing Sheets

(51) Int. Cl.
　　　*E04H 1/12*　　　(2006.01)
　　　*F03D 9/00*　　　(2016.01)
　　　*F03D 9/25*　　　(2016.01)
　　　*F03D 13/40*　　　(2016.01)
　　　*F24S 25/00*　　　(2018.01)
　　　*H02S 20/10*　　　(2014.01)
　　　*H02S 40/32*　　　(2014.01)
　　　*H02S 40/44*　　　(2014.01)

(52) U.S. Cl.
　　　CPC ............... *F03D 9/007* (2013.01); *F03D 9/25* (2016.05); *F03D 13/40* (2016.05); *F24S 2025/012* (2018.05); *H02S 20/10* (2014.12); *H02S 40/32* (2014.12); *H02S 40/44* (2014.12); *Y02E 10/50* (2013.01)

(58) Field of Classification Search
　　　CPC . H02S 40/32; H02S 40/44; E04H 2001/1283; Y02E 10/50; F03D 9/007; F03D 9/25; F03D 13/40; F24S 2025/012
　　　See application file for complete search history.

(56) References Cited

U.S. PATENT DOCUMENTS

2018/0041159 A1\*　2/2018　DeBartolo, III ........ F24S 25/13
2019/0006984 A1　　1/2019　Albertella \* cited by examiner

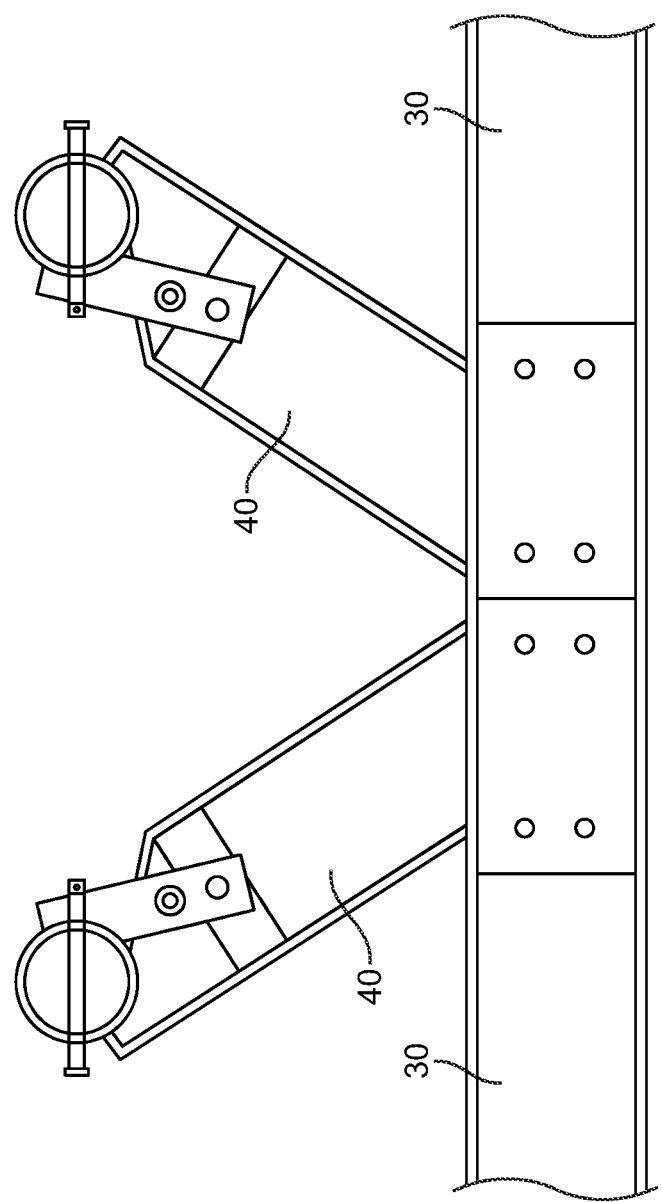

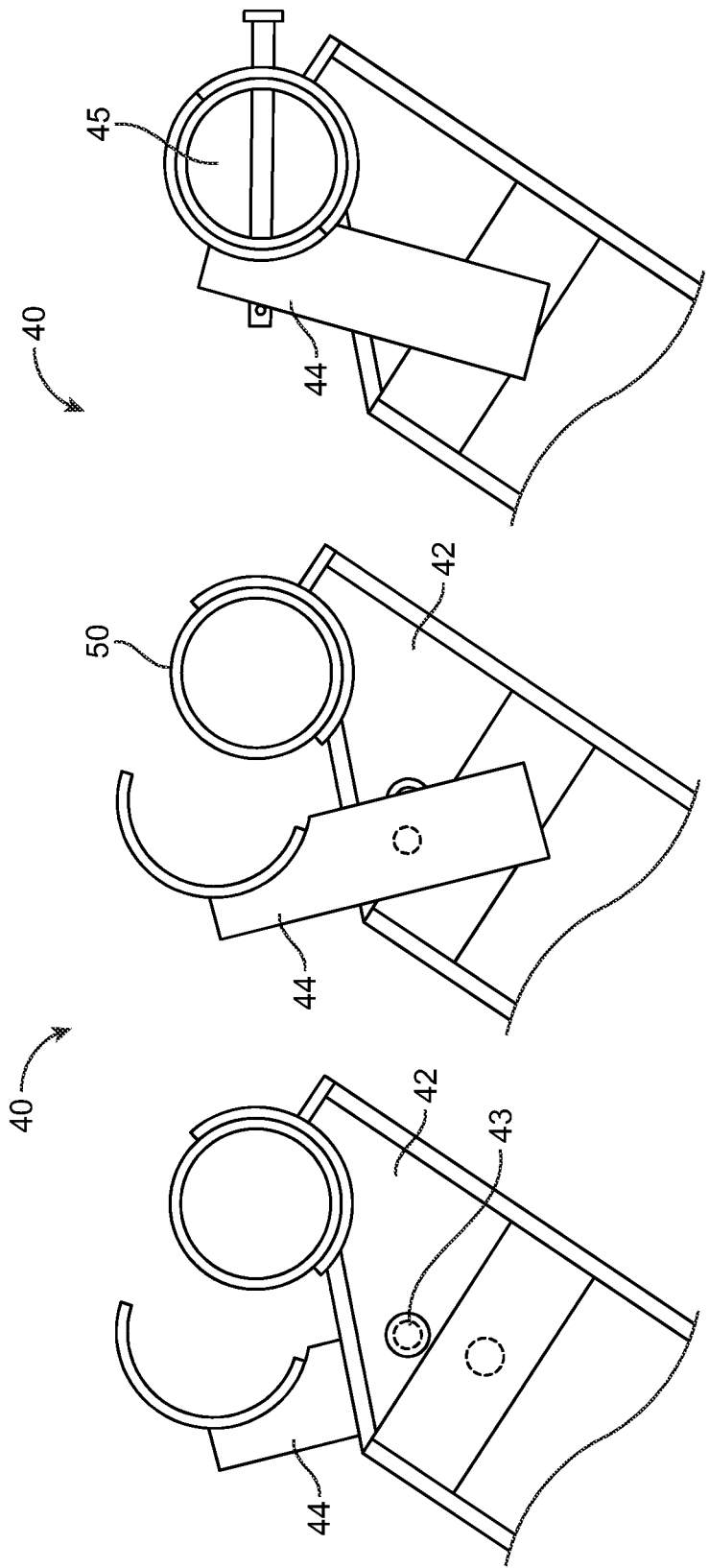

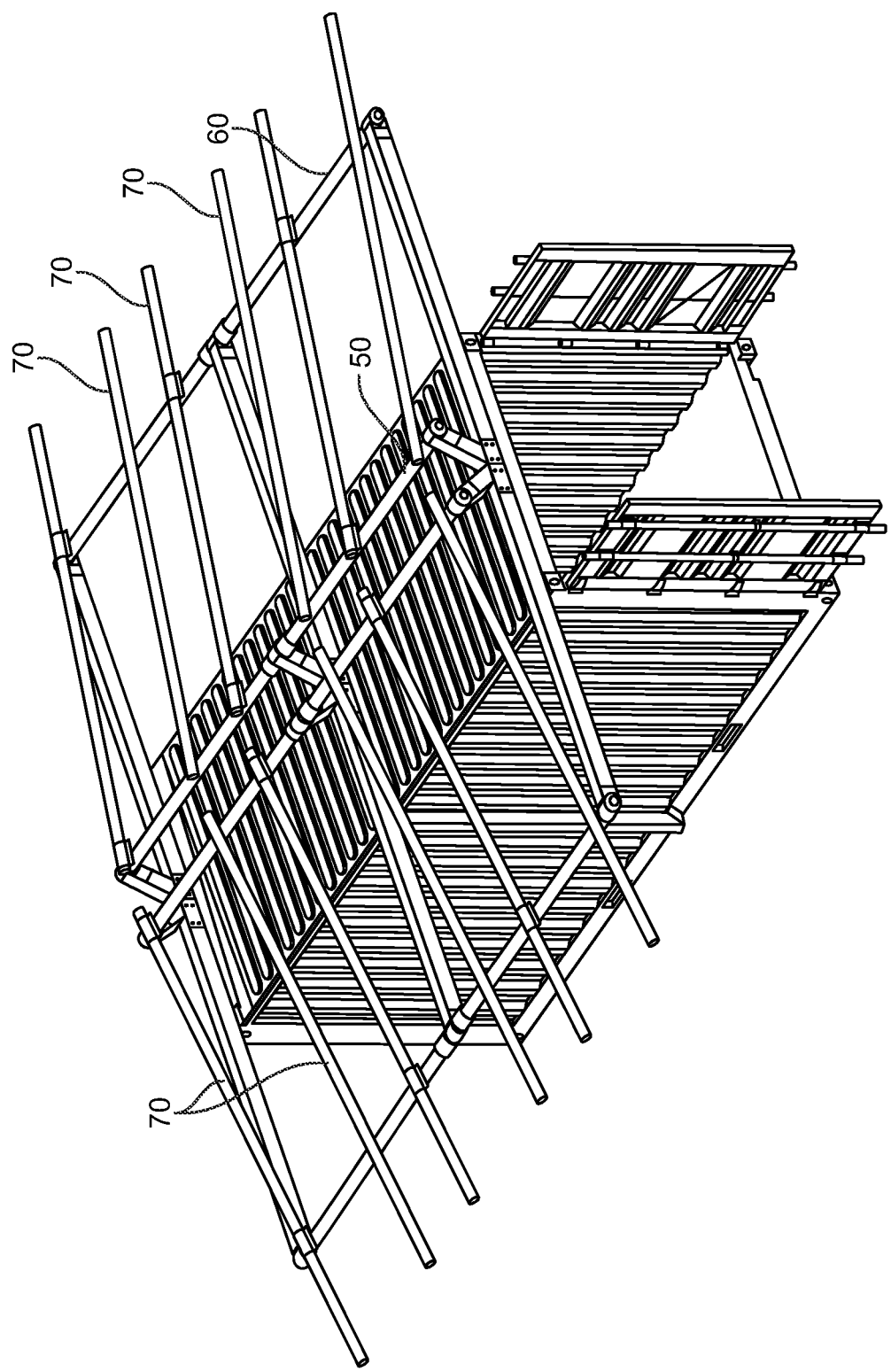

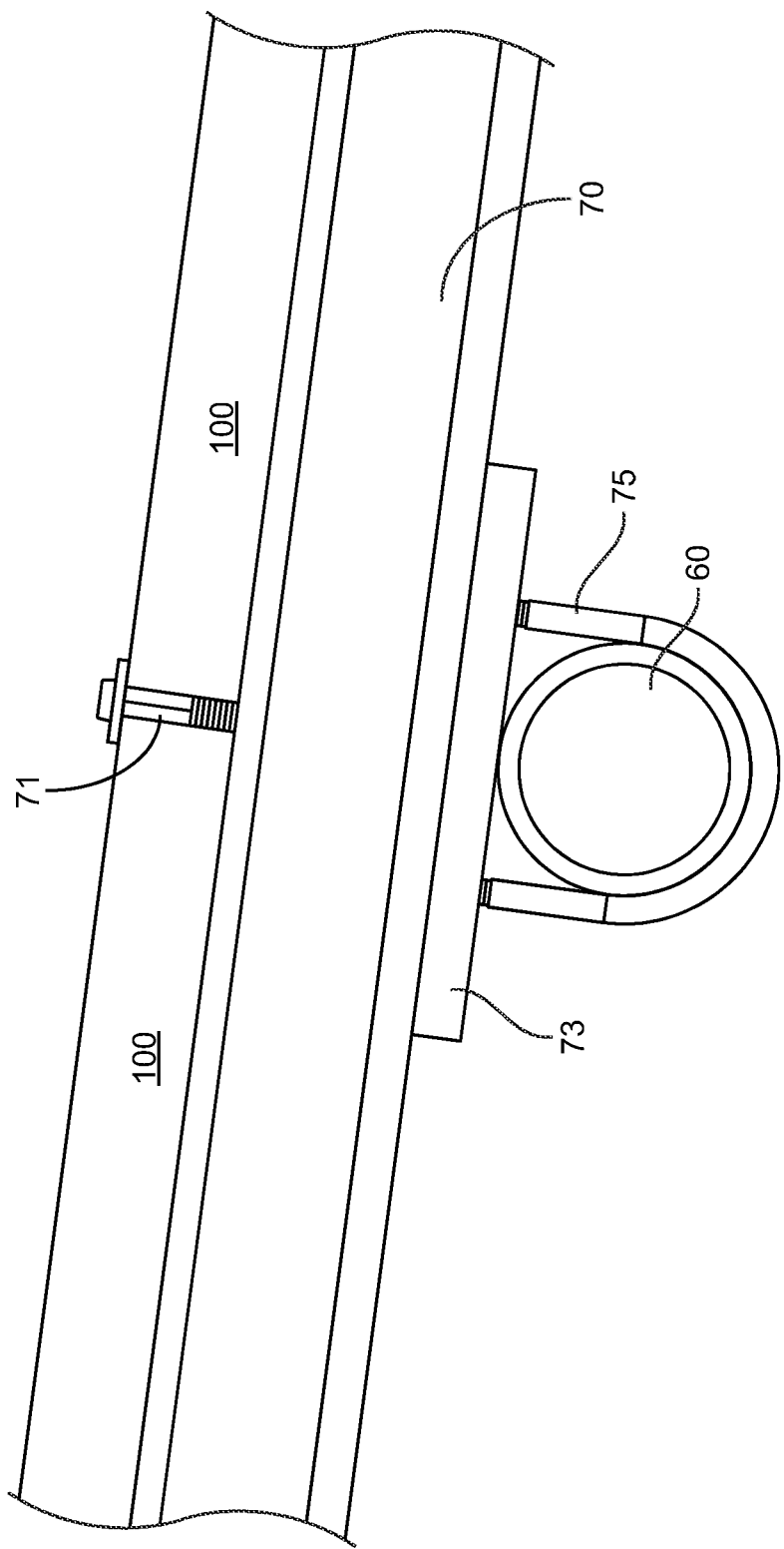

SOLAR MOUNTING SYSTEM FOR A SHIPPING CONTAINER

RELATED APPLICATION

The present application claims priority to U.S. Provisional Patent Application 63/318,314, of same title, filed Mar. 9, 2022, the entire disclosure of which is incorporated herein by reference in its entirety.

TECHNICAL FIELD

The present system relates to field deployable, off-grid solar power generating systems in general and to solar PV power systems that may be used to power remote water treatment or desalination systems in particular.

SUMMARY OF THE INVENTION

The present invention provides a solar PV mounting system that is configured to be assembled on top of a standard shipping container. As will be shown, each of the components of the present solar PV mounting system can be stored within the shipping container itself. As such, the present solar mounting system can be shipped to a remote jobsite packed within the shipping container and then taken out of the shipping container and assembled. The shipping container itself is used as the base upon which the mounting system is built. As a result, the present invention is ideally suited for use in remote (e.g.: off-grid) locations and provides a way in which to deliver a solar power generating station to a remote location such as a village in a developing country. Once deployed and assembled into its final form, it can be used to power a remote water treatment facility or a desalination facility, or for other power generation uses.

One advantage of using the present shipping container itself as the building upon which the PV mounting system and modules are actually attached is that it is not necessary to find and use an existing building at the remote village for solar module deployment. Instead, the present shipping container provides a solid footing that elevates the solar modules safely above the ground. Moreover, the present shipping container can initially be set down at the best preferred location and direction (for example, facing in an optimal direction for the solar modules mounted thereon).

In preferred aspects, the present system provides a solar mounting assembly both for transportation and use with a shipping container, preferably comprising: a shipping container; a plurality of laterally extending beams connected to the top of the shipping container (which extend outwardly from top side edges of the shipping container); support mounts connected to the laterally extending beams (with some of the support mounts being positioned centrally over the top of the shipping container and others at the ends of the laterally extending beams); a first set of upper longitudinal beams spanning between the support mounts at locations above the top center of the shipping container; a second set of lower longitudinal beams spanning between the ends of the laterally extending beams at locations outwardly from the sides of the shipping container; and PV module support rails extending between the first (i.e.: upper) and second (i.e.: lower) sets of longitudinal beams such that the module support rails are angled to the ground. PV modules are then quickly and easily attached onto the module support rails.

Preferably, the first set of longitudinal beams (which are positioned over the top of the shipping container) are positioned higher than the second set of longitudinal beams (which are positioned spaced apart from the sides of the shipping container). As a result, the PV modules (which may be conveniently positioned on the module support rails that are attached at their ends to the longitudinal beams) slope outwardly from a high point above the center of the shipping container to low points on either side of the shipping container.

As will be shown herein, the present mounting system can be assembled quickly and easily using a minimum of hardware. This is especially advantageous given the preferred use of the present system at remote locations such as villages in developing countries. Each step in assembling the present system is fast and intuitive as well. Specifically, the longitudinal beams and associated support mounts can first be quickly attached onto the top of the shipping container. Additional support mounts (preferably using the same support mount design) can be placed at the ends of the laterally extending beams. As such, the first and second sets of longitudinal beams can be installed quickly and easily secured into the support mounts using a minimal amount of time and hardware. In fact, in a preferred design, one or two cotter pins can be used to lock each of the ends of the longitudinal beams into one of the support mounts.

In addition, the present system preferably includes PV modules and a novel PV module clamping system for connecting the PV modules to the PV module support rails. In preferred aspects, the module support rails can be quickly attached onto one of the longitudinal beams with a bracket and one or more bolts. In preferred aspects, the module support rail has a groove that can be slidably received onto one or more bolts that pass through the bracket. The advantage of this grooved design is that it requires a minimum amount of fasteners, and permits slidable adjustment and positioning during system assembly.

Optionally, laterally extending ground supports can also be connected to the bottom of the shipping container. These optional ground supports extend away from the sides of the shipping container. Since they extend in the same direction as the module support rails and the modules themselves (i.e.: outwardly away from the sides of the shipping container), these optional ground supports can provide stability against wind loading on the PV modules.

The first set of longitudinal beams is positioned higher than the second set of longitudinal beams such that the PV module support rails (which span between the two longitudinal beams) are positioned to slope downwardly from upper ends above the center to the sides of the shipping container. This both provides a desired angle of the PV modules with respect to the sun and permits rain drainage off the modules.

Preferably each of the support mounts (i.e.: support mounts both above the center of the shipping container and at the far outward ends of the laterally extending beams projecting outwardly from the sides of the shipping container) comprise: a stationary first portion shaped to cradle one of the longitudinal beams, and a moveable second portion also shaped to cradle the longitudinal beam. As such, a longitudinal beam can be set onto the stationary first portion and then secured into position by moving the second portion of the support mount from an open to a closed position. The first and second portions of the support mount can be connected together with a single cotter pin. An advantage of this design is that it is very quick and easy to attach the longitudinal beams into these support mounts. Moreover, the longitudinal beams are preferably cylindrical and the portions of the support mounts cradling the beams are circular. As such, the longitudinal beam can be quickly placed into the support mount in any position around its longitudinal axis. As such, it is not necessary to rotate the longitudinal beams into a preferred position before attaching them to the support mounts.

Advantages of the present system include the fact that all of the components required for the solar mounting system can be stored within (and shipped with) the shipping container itself. Extra components and assembly equipment can even be stored in the shipping container too, as desired. As such, the shipping container can be delivered to a remote site and then the solar panel mounting system can be removed from within the shipping container and quickly and easily be installed on top of the shipping container. The set up and assembly of the present system is fast and easy. As such, the present system provides an effective and economic field deployable, off-grid power PV generation system. The shipping container serves both as the box in which the entire system is stored and transported, and as part of the supporting structure underneath the deployed photovoltaic array. An additional advantage of the present design is that the PV array deployed above the shipping container can provide shading for sensitive electronic components that may be within the shipping container. The shipping container can also be locked securely.

A further advantage of the present system is that the PV Modules can be quickly and easily attached onto the module support rails which span between the (upper) and (lower) longitudinal beams. In preferred aspects, the modules can be held onto the rails by a bolt positioned at the sides of the modules. A single bolt fastener can even be used to secure two modules with the side edges of the bolt fastener securing the side edges of a first PV module on one side and a second PV module on the other side. Thus, a minimum of hardware is required to securely fasten the modules onto the module support rails. In additional embodiments, the connectors holding the module support rails to the longitudinal beams can even be moved to various positions along the longitudinal beams both to permit small adjustments, but optionally could even be moved to positions that support PV arrays of different module widths.

BRIEF DESCRIPTION OF THE DRAWINGS

FIG. 3B is a close-up view of the support mounts at the top center of FIG. 3A.

FIGS. 3C to 3E show sequential view of one of the support mounts of FIG. 3B holding onto one of the upper longitudinal extension beams, as follows.

FIG. 3C is a close-up view of the top end of one of the support mounts prior to receiving one of the upper longitudinal beams therein.

FIG. 3D is a view corresponding to FIG. 3C after the upper longitudinal beam has been placed therein.

FIG. 3E is a view corresponding to FIG. 3D after the upper longitudinal beam has been locked into position.

FIG. 5A is a perspective view showing the positioning of the module support rails spanning between the upper and lower longitudinal beams.

FIG. 5D is a front view showing a pair of PV modules secured to the top of the module support rail, with the module support rail in turn being secured on top of the one of the longitudinal beams.

DETAILED DESCRIPTION OF THE DRAWINGS

Figure 1:
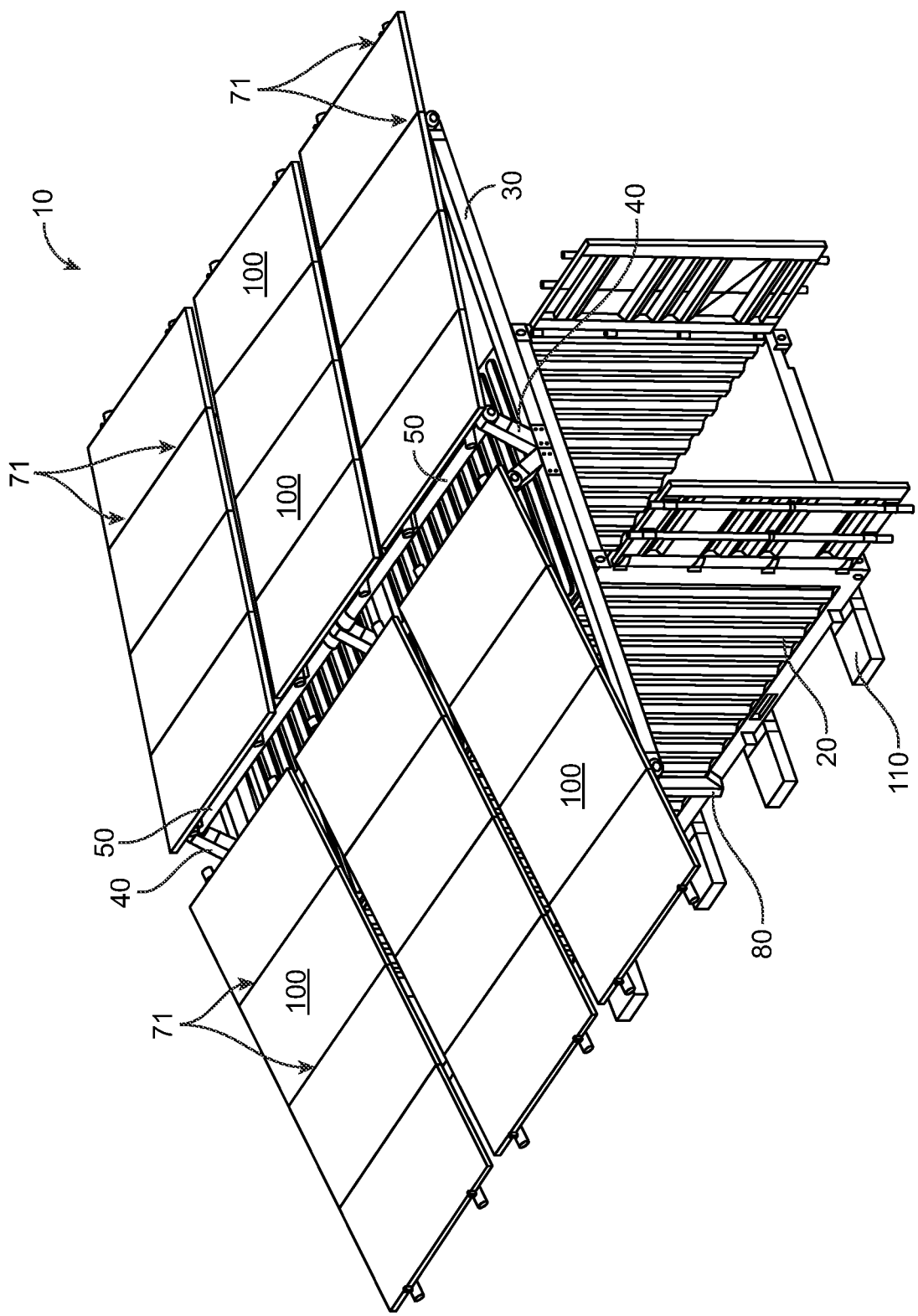
FIG. 1 is a perspective view of the present system in a deployed position.

In preferred aspects as illustrated in the various figures, the present system provides a solar mounting system 10 this is transported in, and mounted onto, a shipping container 20. Mounting system 10 is stored within the shipping container prior to deployment and includes: laterally extending beams 30 that extend outwardly from the top of shipping container 20 to beyond the sides of the shipping container; support mounts 40 connected to the laterally extending beams 30 at positions over the top of the shipping container; a first set of (higher) longitudinal beams 50 spanning between support mounts 40; a second set of (lower) longitudinal beams 60 spanning between ends of the laterally extending beams 30 at positions beside the shipping container; and a plurality of PV module support rails 70 extending between the first and second sets of longitudinal beams 50 and 60, with PV modules 100 mounted onto the PV module support rails 70 such that the PV modules slope downwardly from above the center of the shipping container to positions beyond the sides of the shipping container.

Figure 2:
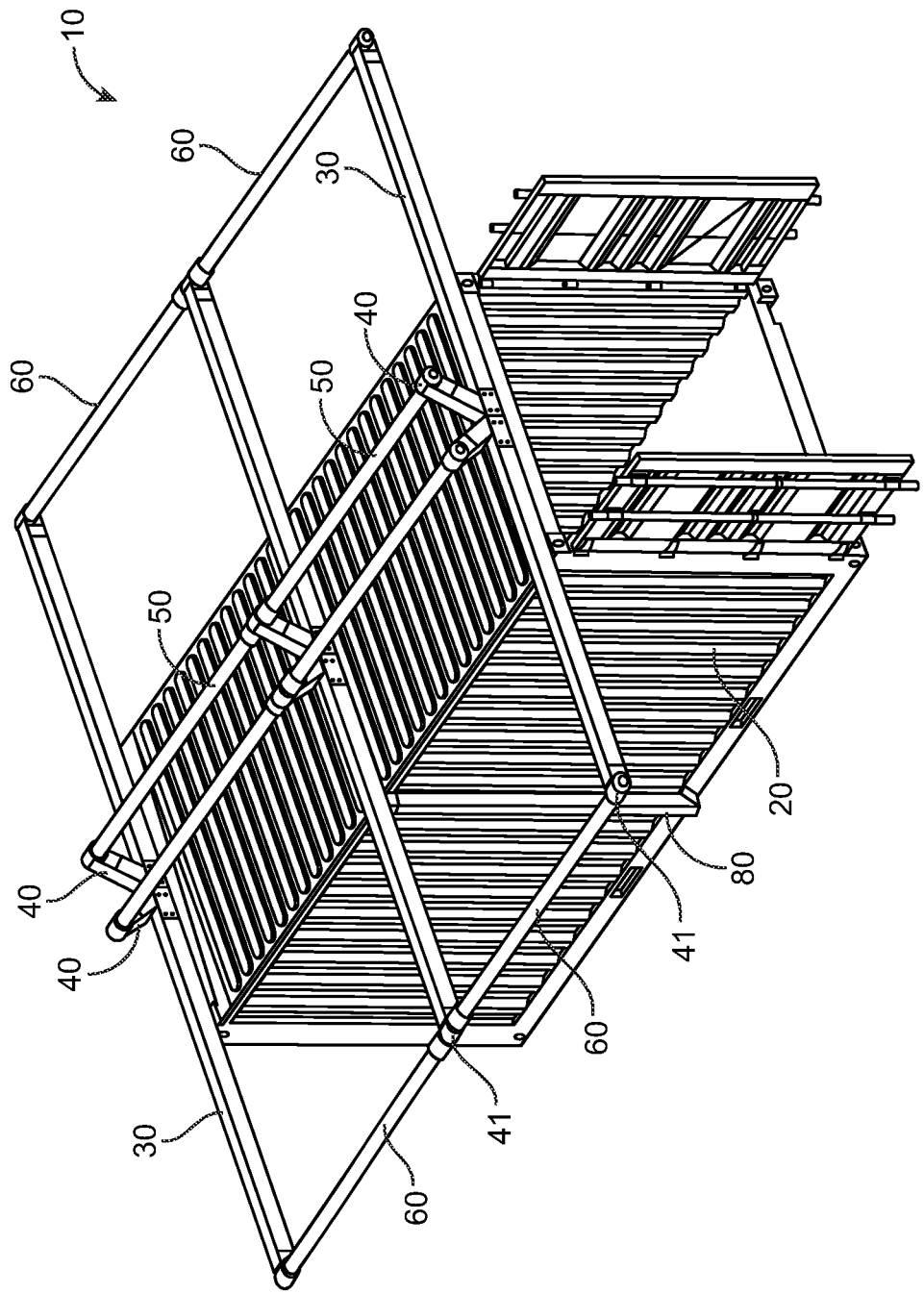
FIG. 2 corresponds to FIG. 1, but has the solar PV modules removed such that the present mounting system can be better seen.

FIG. 1 is a perspective view of the present system in a deployed position and FIG. 2 corresponds to FIG. 1, but has the solar PV modules removed such that the present mounting system can be better seen. Referring first to FIGS. 1 and 2, a shipping container 20 is first transported to a remote jobsite. An ideal site for positioning shipping container 20 is determined. Once shipping container 20 has been placed at the desired location, various components (that are stored therein) are removed and construction begins, as follows.

First, laterally extending beams 30 are first secured onto the top of shipping container (as best seen in FIG. 2). It is to be understood that laterally extending beams 30 may each be one single integral I-beam or may be assembled from a plurality of separate shorter beams. Beams 30 need not be I-shaped, but may have other cross sectional shapes as well, keeping within the scope of the present invention. It is also to be understood that although FIGS. 1 and 2 illustrate three laterally extending beams 30 (with one beam at each of the font, back and middle of shipping container 20), the presently claimed invention also encompasses embodiments with different numbers of laterally extending beams 30 at different locations along the top of the shipping container. Laterally extending beams 30 are positioned on top of shipping container and extend across the top of shipping container 20, and extend outwardly from the sides of shipping container 20 as shown.

As seen in FIGS. 2, and 3A to 3D, support mounts 40 are connected onto laterally extending beams 30. As can be seen, support mounts 40 are positioned over the top of shipping container 20 and near the top center of shipping container 20. In accordance with the present system, support mounts 40 may be attached to longitudinal beams 30 by any means or system of connection. In one embodiment, ¼ turn corner locks may be used to attached support mounts 40 to longitudinal beams 30. However, other fastening and connection systems may be used instead, all keeping within the scope of the present invention.

Figure 3A:
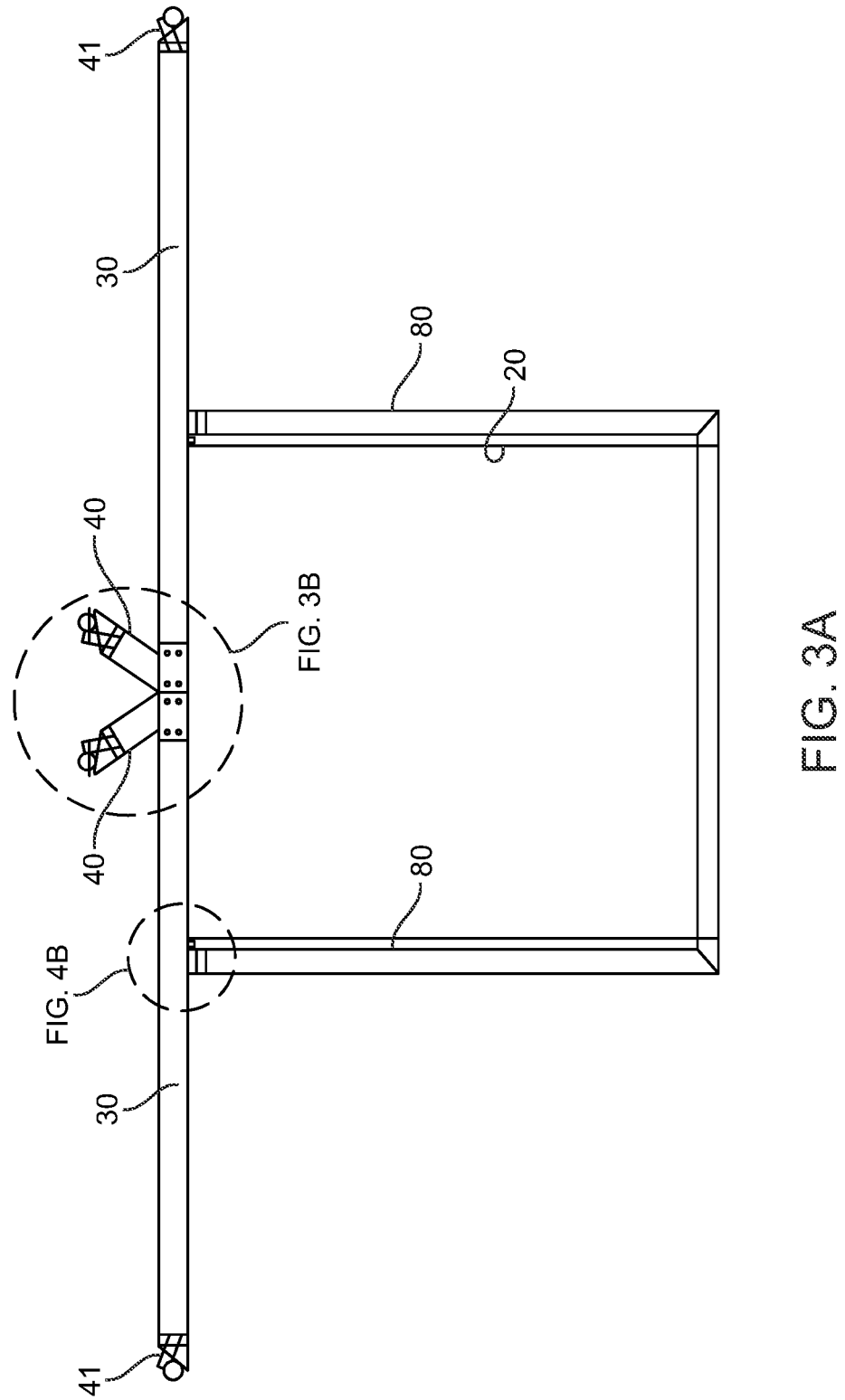
FIG. 3A is a sectional side elevation view through the mid-section of the shipping container.

As can also be seen in FIG. 3A, additional support mounts 41 can be positioned at the outward ends of laterally extending beams 30, as shown. In preferred aspects, support mounts 41 can be made of the same construction as support mounts 40, and operate in the same manner. Therefore, in various aspects, support mounts 40 are used to secure (upper) longitudinal beams 50. Similarly, support mounts 41 are used to secure (lower) longitudinal beams 60. Although support mounts 40 and 41 may preferably operate in the same manner, it is to be understood different mount designs may be used, all keeping within the scope of the present invention.

FIGS. 3C to 3E illustrate the operation of one of support mounts 40, as follows. In FIG. 3C, the support mount 40 in an open position prior to receiving the upper longitudinally extending beam 50 therein. Next, FIG. 3D shows the support mount 40 in an open position after upper longitudinal beam 50 has been received therein. Lastly, FIG. 3E shows the support mount 40 in a closed position around upper longitudinal beam 50, with upper longitudinal beam 50 locked firmly therein.

As can be seen, each support mount 40 optionally comprises: a stationary first portion 42 shaped to cradle one of the longitudinally extending beams 50, and a moveable second portion 44 also shaped to cradle the longitudinal extending beam 50. During assembly, the longitudinally extending beam 50 is first set onto the stationary first portion 42 and then secured into position by moving the second portion 44 of the support mount from an open to a closed position. As can be seen, beam 50 is preferably cylindrical such that the first and second portions 42 and 44 of the support mount are curved to together wrap round the longitudinal beam (regardless of the position of beam 50 around its longitudinal axis). Simply put, longitudinally extending beam 50 is simply dropped into support mount 40 without having to be rotated into a preferred position first. In preferred aspects, a locking pin 45 can be included and is received through the first and second positions 42 and 44 of the support mount to prevent second portion 44 of the support mount from moving after it has been moved into its closed position. In addition, another locking pin (not shown) can also pass through portions 42 and 43 at location 43 to prevent motion between portions 42 and 44. It is to be understood that other exemplary locking pin type connections and configurations can be used as well, all keeping within the scope of the present invention. The advantage, however, of these various embodiments and systems is that a secure system for holding longitudinally extending beam 50 into support 40 is provided using a minimum amount of hardware. Thus, the attachment of the ends of longitudinally extending beams 50 onto supports 40 can be carried out very quickly and easily.

Lower longitudinally extending beams 60 can be similarly attached onto support mounts 41 using the same equipment and configurations described above. It is also to be understood that in various embodiments, upper longitudinally extending beams 50 and lower longitudinally extending beams 60 can comprise single long beams extending the full length of shipping container 20 or may comprise a series of shorter beams positioned end to end. For example, in the illustrations of FIG. 2, two upper beams 50 may be used (one extending from the front to the middle of the shipping container, and the other extending from the middle to the back of the shipping container), and two lower beams 60 may also be used (one extending from the front to the middle of the shipping container, and the other extending from the middle to the back of the shipping container).

As also seen in FIG. 2, the first set of longitudinally extending beams 50 is positioned higher than the second set of longitudinally extending beams 60. As a result, the PV module support rails 70 (FIG. 3) are positioned to slope downwardly from the center to the sides of the shipping container. This sloping orientation for the PV modules 100 ensures a desirable angle of tilt of the PV modules with respect to the ground which provides wind resistance and rain drainage from the top of the modules.

Figure 4B:
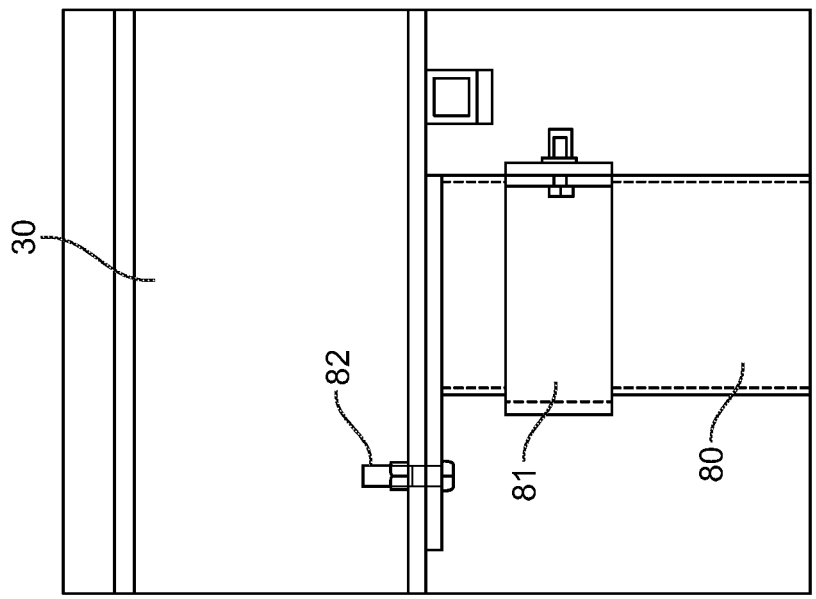
FIG. 4B is a front plan view corresponding to FIG. 4A.
Figure 4A:
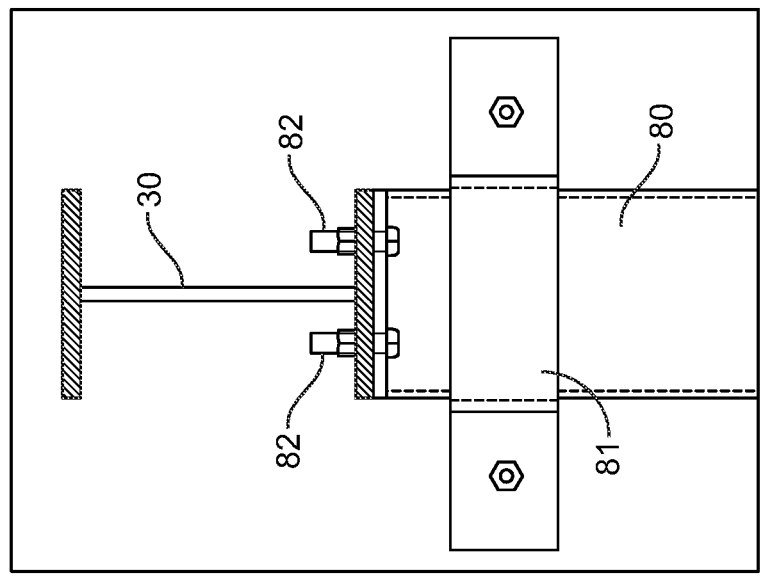
FIG. 4A is a side elevation view of an optional vertical support member on the side of the shipping container with the laterally extending beam fastened on top.

FIGS. 4A and 4B show an optional vertical support member 80 on the side of the shipping container with the laterally extending beam 30 fastened on top. Vertical support member 80 is also seen in FIGS. 1 and 2 and is positioned at the mid-point of shipping container 20. A bracket 81 can be used to secure vertical support member 80 to the side of the shipping container and bolts 82 can be used to secure laterally extending beam 30 to the top of vertical support member 80.

Figure 5B:
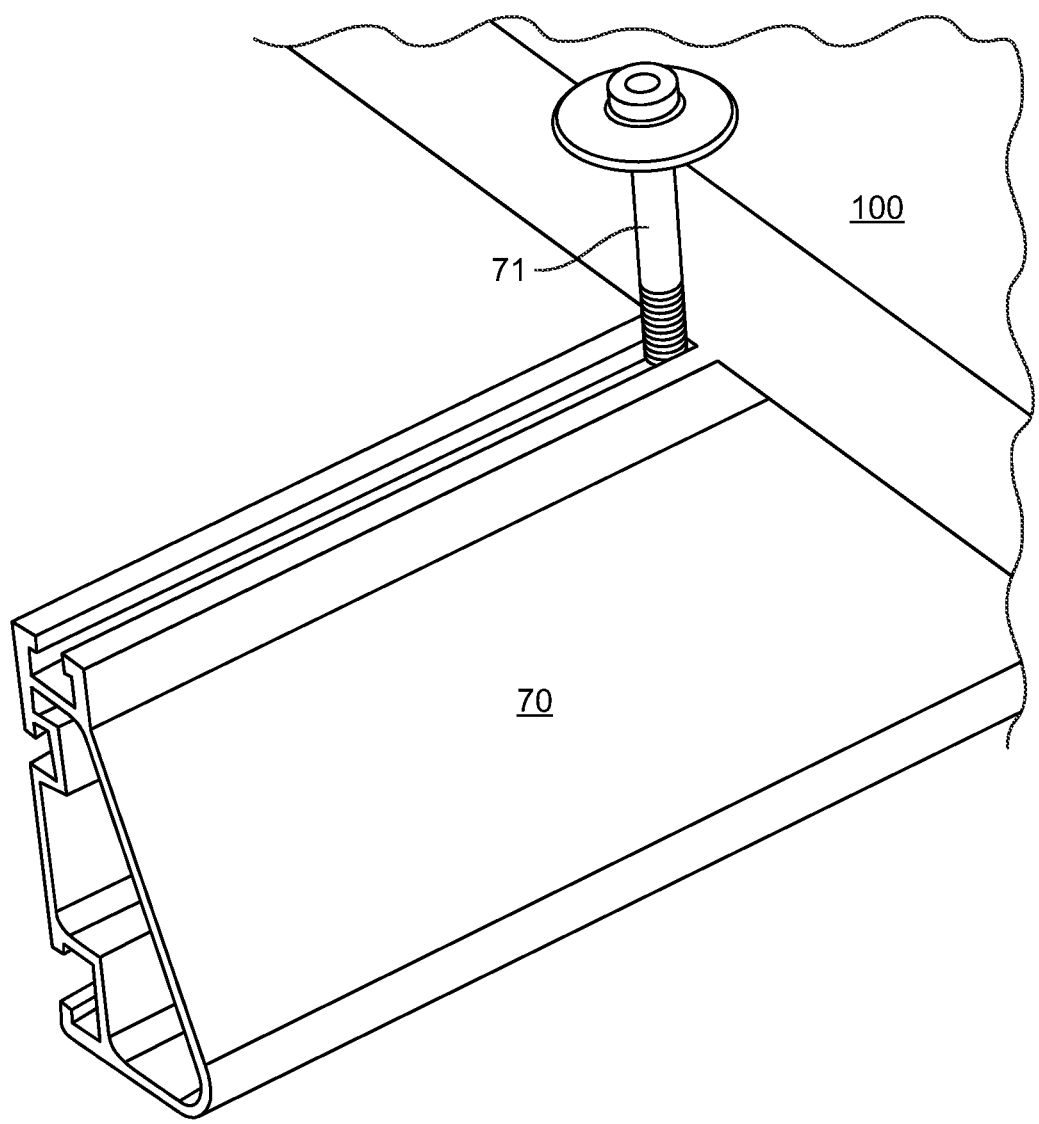
FIG. 5B is a perspective view of one of the module support rails showing a bolt-type module clamp holding onto the side of one of the PV modules.
Figure 5C:
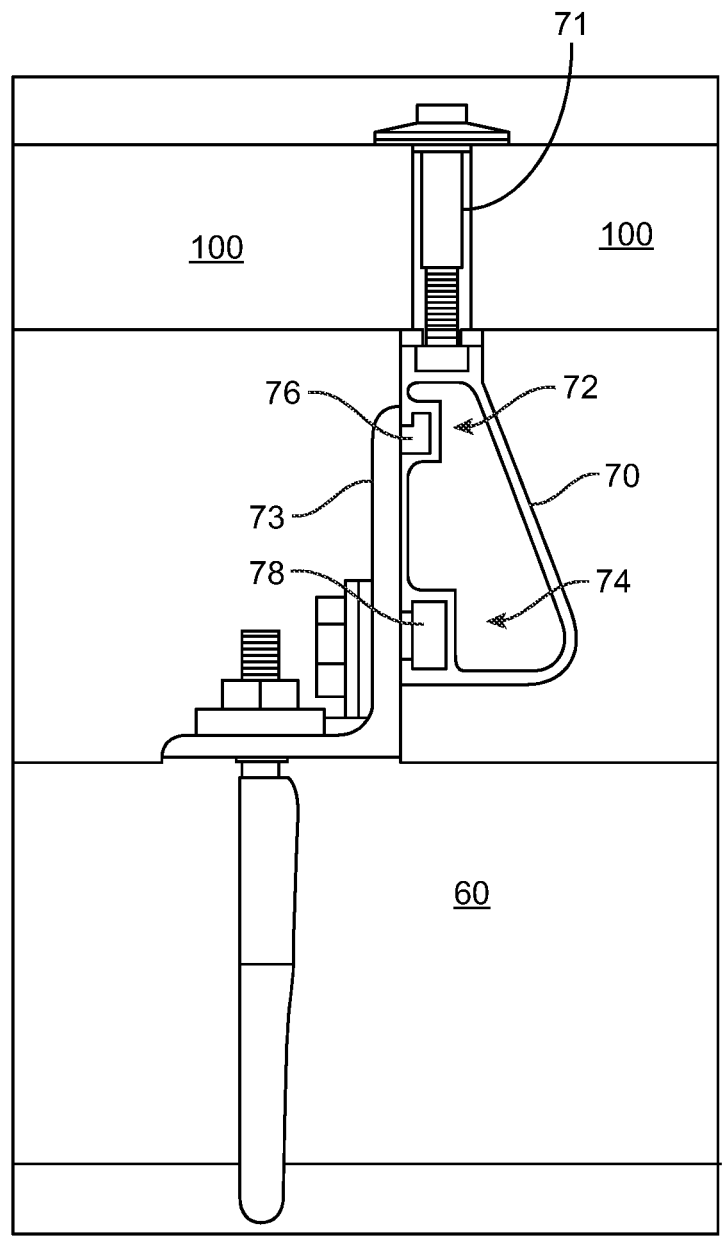
FIG. 5C is a view showing a section of a module support rail with a bolt-type module clamp positioned above for securing the PV modules and U-bolt positioned below for grasping around and securing the module support rail one of the lower longitudinal beams.
Figure 5E:
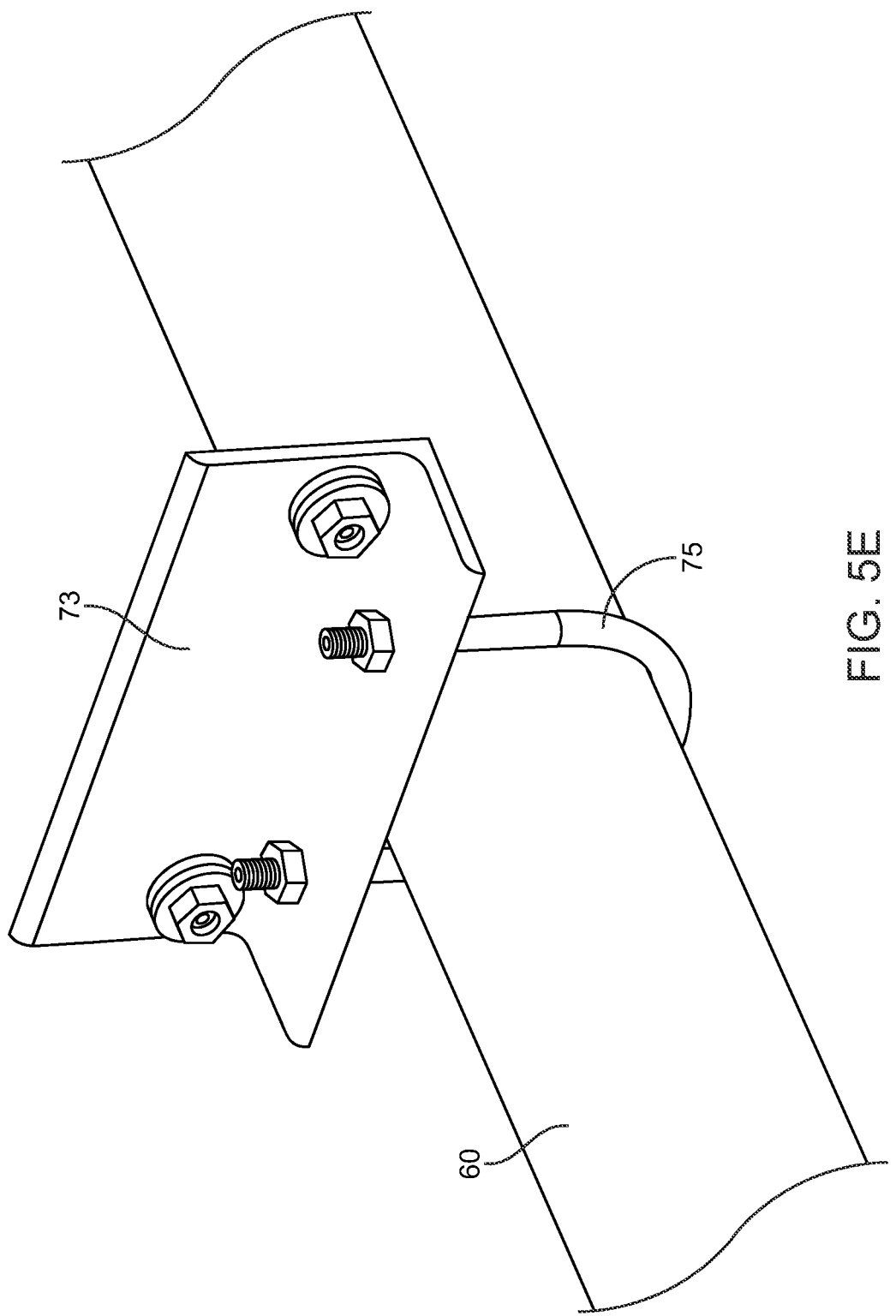
FIG. 5E is a perspective view showing an L-shaped bracket attached onto one of the longitudinal beams.

After beams 30, 50 and 60 have all been secured into position, the PV modules are attached thereto, as follows. As seen in FIGS. 5A to 5E, module support rails 70 are secured to both upper and lower longitudinally extending beams 50 and 60, and PV modules 100 are attached on top of module support rails 70. FIG. 5A shows the positions of module support rails 70. FIG. 5B shows a perspective close-up of a module support rail 70 with a PV module 100 secured on top. As can be seen, module support rail 70 can be an extruded section of material having an upper groove 72 and a lower groove 74 extending therealong. As seen in FIGS. 5C and 5E, and L-shaped support bracket 73 can be slidably attached onto module support rail 70. Specifically, L-shaped bracket 73 may have a protrusion 76 extending therefrom which is received into upper groove 72. Bolts 78 may be secured into lower groove 74. As best seen in FIGS. 5D and 5E, a U-shaped bracket 75 may be used to secure L-shaped bracket 73 onto longitudinally extending beam 60.

In preferred aspects, the clamping system and method used to secure the lower ends of module support rails 70 to lower longitudinally extending beams 60 can be the same connection system used to secure the upper ends of module support rails 70 to upper longitudinally extending beams 50. After module support rails 70 have been securely positioned (as seen in FIG. 5A), the PV modules 100 can be attached. As seen in FIG. 5B, the attachment of PV modules onto module support rails 70 can be accomplished quickly and easily using bolt-type module clamps 71. As can be seen, each module clamp 71 can be positioned adjacent to a side edge of a PV module frame 100. Preferably, as seen in FIG. 5D, a single module clamp 71 can be used to secure the side edges of two PV module frames 100. Specifically, a lower module can be installed first (with a module clamp 71 holding its lower side). Next, another module 100 can be added (with another module clamp 71 simultaneously holding the upper side edge of the first PV module and the lower side edge of the second PV module).

Figure 6A:
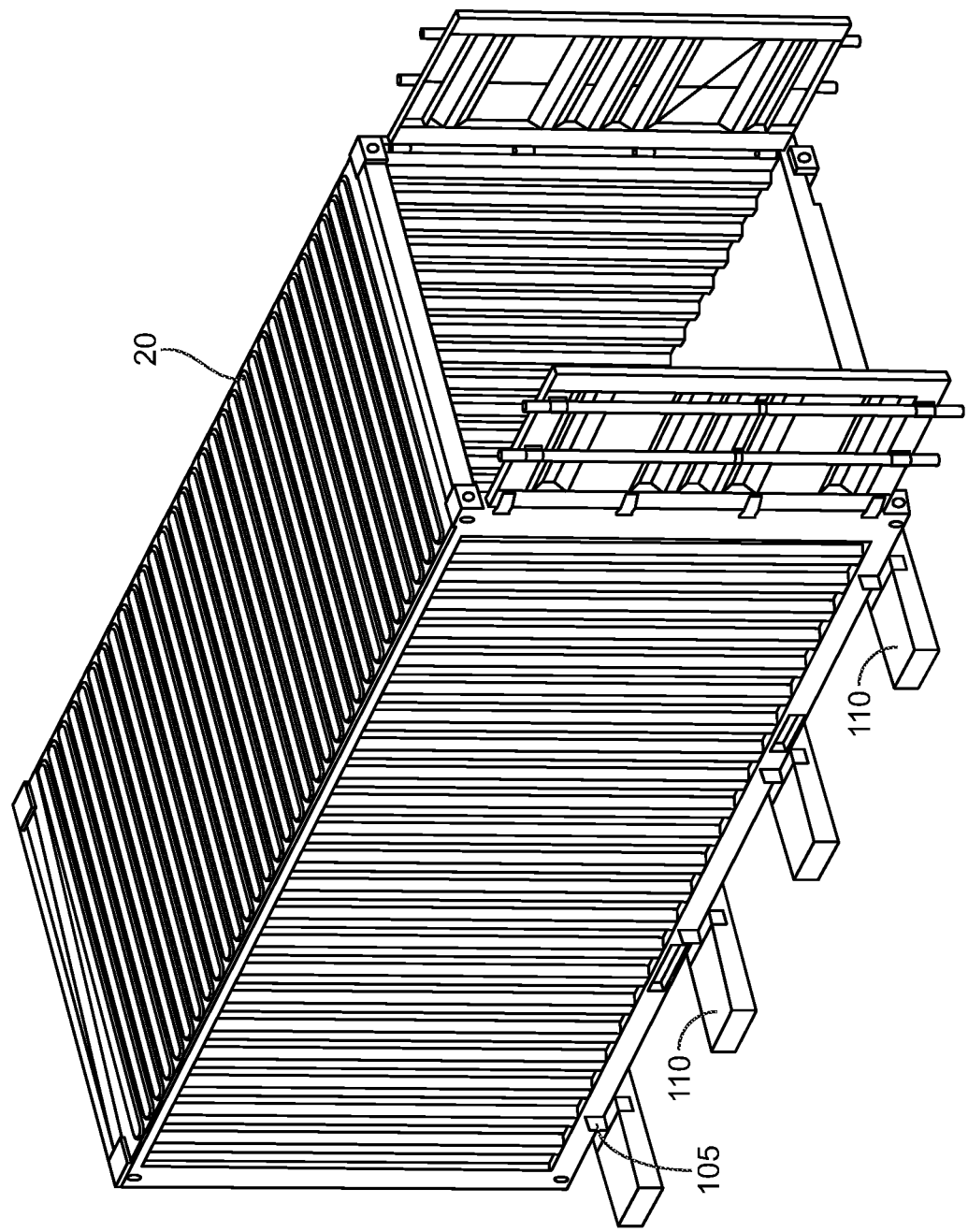
FIG. 6A is a front perspective view of the shipping container sitting on top of laterally extending ground supports.
Figure 6B:
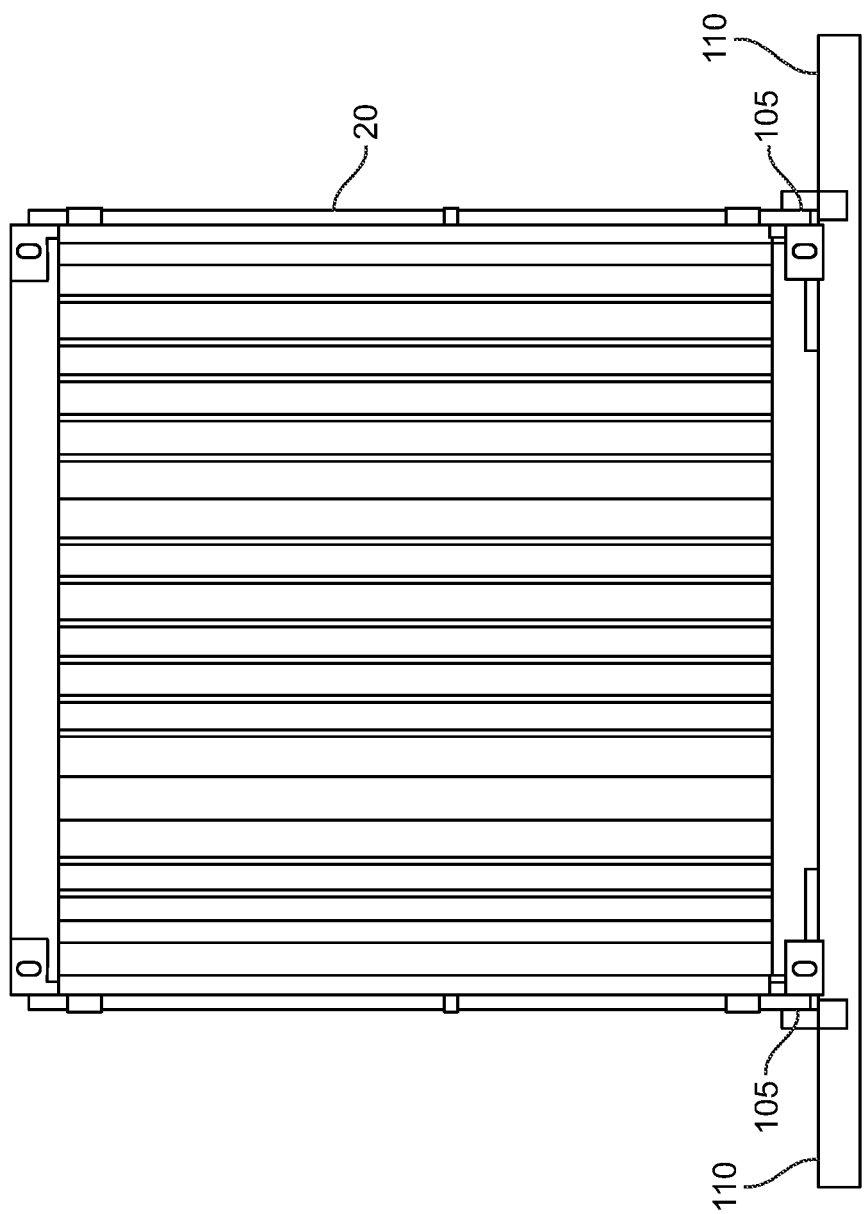
FIG. 6B is a front elevation view corresponding to FIG. 6A.
Figure 6C:
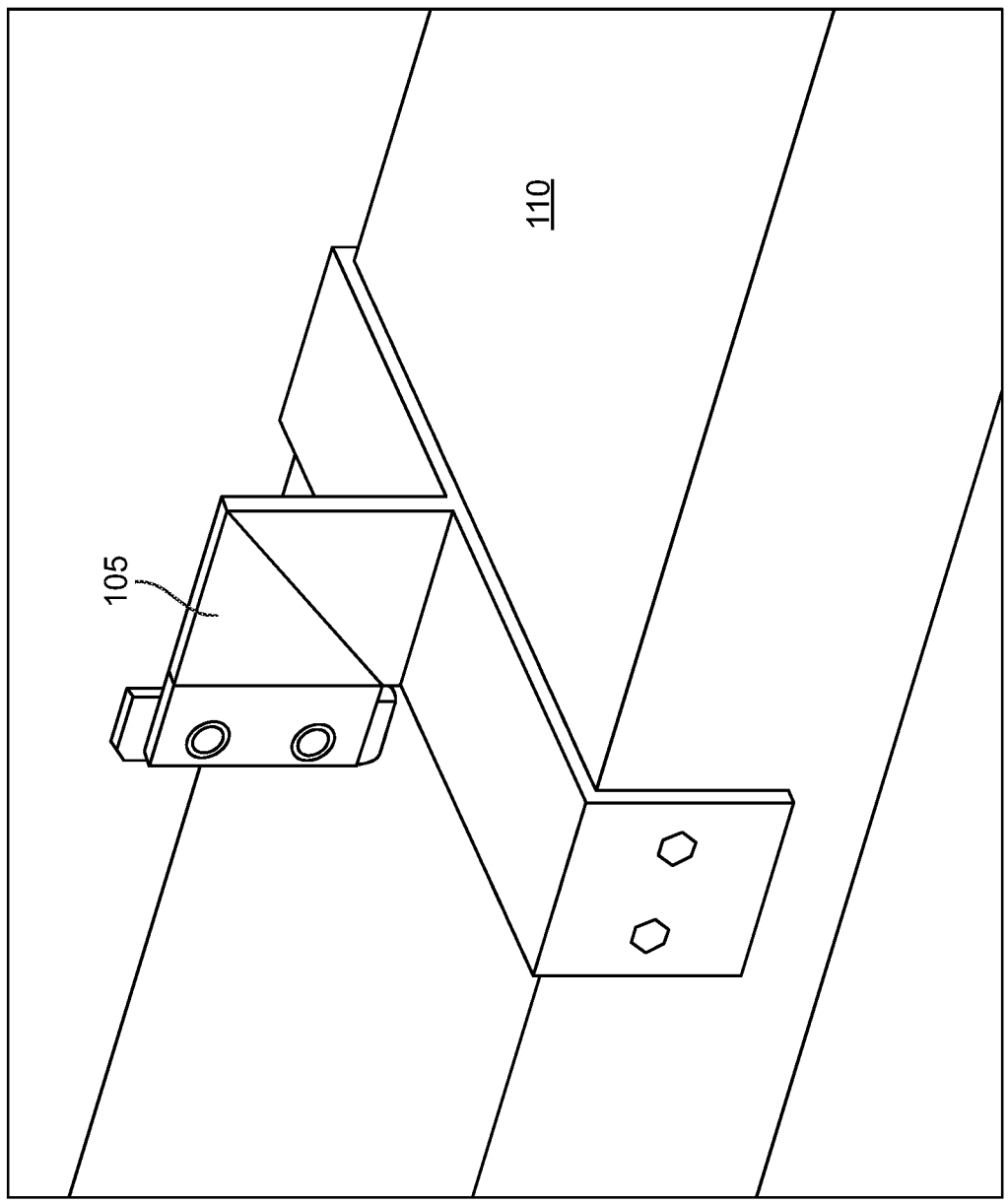
FIG. 6C is a perspective view showing a fastener for securing the shipping container to one of the ground supports.

FIGS. 6A to 6C show the shipping container 20 sitting on top of (and fastened to) laterally extending ground supports 110. Ground supports 110 extend laterally outwardly to the sides of shipping container 20 in the same direction as the PV modules extend. As such, laterally extending ground supports 110 provide stability against wind loading. In optional aspects, clamps 105 are used to connect ground supports 110 to the bottom of shipping container 20.

Figure 7:
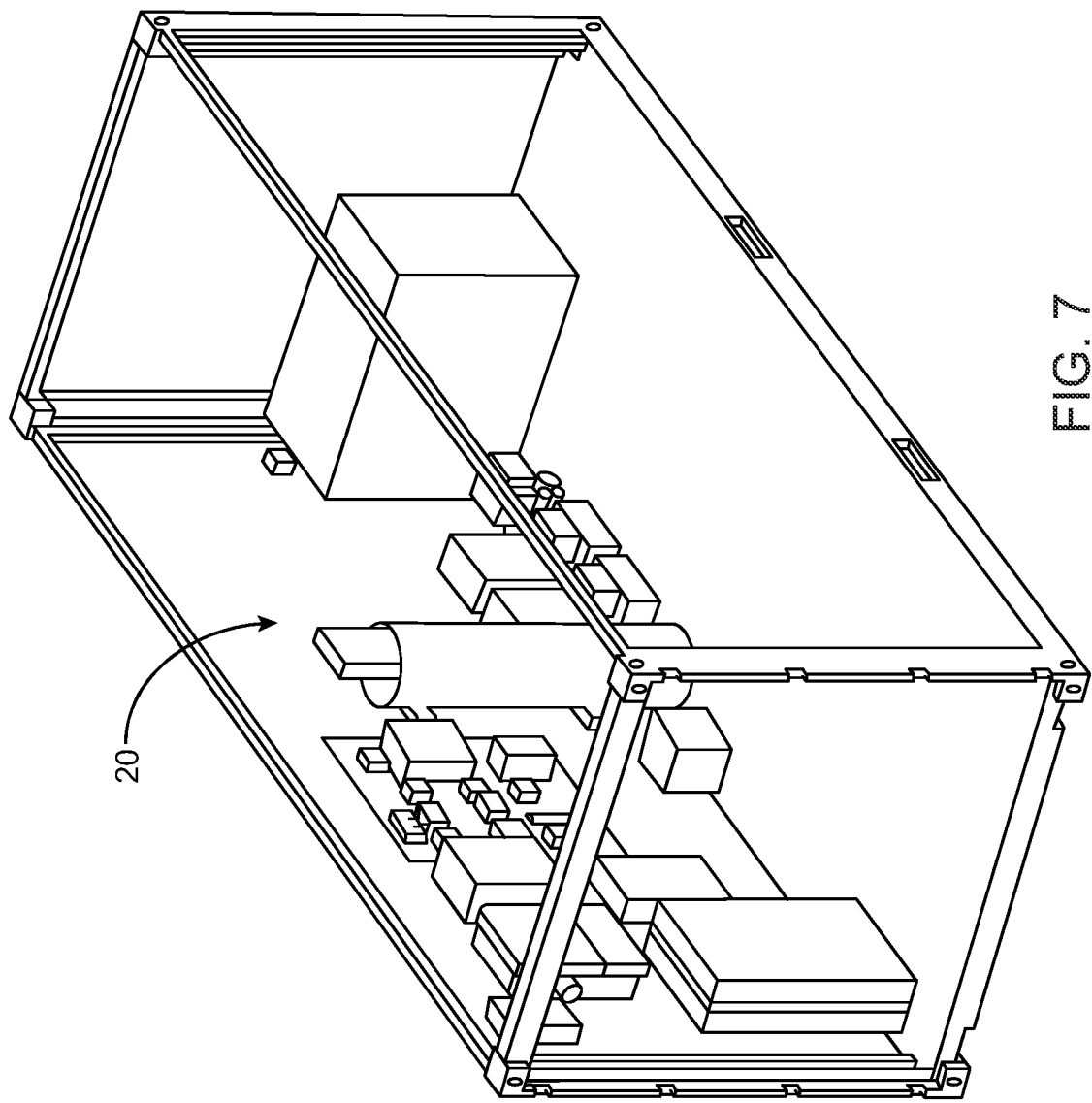
FIG. 7 is cut away a perspective view showing various optional components and equipment stored within the shipping container.

Lastly, FIG. 7 is a cut away a perspective view showing various optional components and equipment stored within shipping container 20. It is to be understood that the present system is not limited to any particular equipment or components being stored in shipping container 20. As such, in addition to the present mounting system, its associated beams, rails, fasteners and PV modules, additional equipment may also be stored in shipping container 20. For example, equipment needed to install a remote water treatment facility or a desalination system may be included. As can also be appreciated, the interior of the shipping container 20 may be used as a system control room with various electrical and logic components installed right onto the interior side walls of the shipping container.

What is claimed is:

1. A solar mounting system for a shipping container, comprising:
a shipping container;
laterally extending beams secured directly onto to the top of the shipping container to extend across a top surface of the shipping container, the laterally extending beams extending outwardly from top side edges of the shipping container;
support mounts connected to the laterally extending beams, the support mounts being positioned over the top of the shipping container;
a first set of longitudinal beams spanning between the support mounts at locations above the top of the shipping container;
a second set of longitudinal beams spanning between the laterally extending beams at locations to the sides of the shipping container; and
PV module support rails extending between the first and second sets of longitudinal beams.

2. The system of claim 1, further comprising:
PV modules; and
PV module clamping systems connecting the PV modules to the PV module support rails.

3. The system of claim 1, further comprising:
laterally extending ground supports connected to the bottom of the shipping container.

4. The system of claim 1, wherein the first set of longitudinal beams is higher than the second set of longitudinal beams such that the PV module support rails are positioned to slope downwardly from the center to the sides of the shipping container.

5. A solar mounting system for a shipping container, comprising:
a shipping container;
laterally extending beams connected to the top of the shipping container, the laterally extending beams extending outwardly from top side edges of the shipping container;
support mounts connected to the laterally extending beams, the support mounts being positioned over the top of the shipping container;
a first set of longitudinal beams spanning between the support mounts at locations above the top of the shipping container;
a second set of longitudinal beams spanning between the laterally extending beams at locations to the sides of the shipping container; and
PV module support rails extending between the first and second sets of longitudinal beams, wherein each of the support mounts comprises:
a stationary first portion shaped to cradle one of the longitudinal beams, and
a moveable second portion also shaped to cradle the longitudinal beam such that the longitudinal beam can be set onto the stationary first portion and then secured into position by moving the second portion of the support mount from an open to a closed position.

6. The system of claim 5, wherein the longitudinal beam is cylindrical and the first and second portions of the support mount are curved to wrap together around the longitudinal beam.

7. The system of claim 6, further comprising:
a locking pin received through the first and second positions of the support mount to prevent the second portion of the support mount from moving after it has been moved into the locked position.

8. The system of claim 1, further comprising:
additional support mounts positioned at the distal ends of the laterally extending beams such that:
a first set of support mounts holds the first set of longitudinal beams over the top of the shipping container, and
a second set of support mounts holds the second set of longitudinal beams at locations to the sides of the shipping container.

9. The system of claim 1, further comprising:
vertical support members mounted onto the sides of the shipping container, wherein the laterally extending beams are connected to the vertical support members.

10. A solar mounting system for a shipping container, comprising:
a shipping container;
laterally extending beams connected to the top of the shipping container, the laterally extending beams extending outwardly from top side edges of the shipping container;
support mounts connected to the laterally extending beams, the support mounts being positioned over the top of the shipping container;
a first set of longitudinal beams spanning between the support mounts at locations above the top of the shipping container;
a second set of longitudinal beams spanning between the laterally extending beams at locations to the sides of the shipping container;
PV module support rails extending between the first and second sets of longitudinal beams;
PV modules; and
PV module clamping systems connecting the PV modules to the PV module support rails, wherein the PV module clamping system comprises:

a plurality of locking pins received into the PV module support rails, each locking pin being positioned adjacent to an edge of a PV module along the length of the PV module support rail; and a C-clamp dimensioned to wrap around one of the second set of longitudinal beams.

11. The system of claim 1, wherein the laterally extending beams are I-beams.

12. The system of claim 1, wherein the lateral beams are cylindrical.

13. The system of claim 8, wherein the support mounts and the additional support mounts are the same design.

14. A solar mounting system for a shipping container, comprising:
a shipping container;
laterally extending beams connected to the top of the shipping container, the laterally extending beams extending outwardly from top side edges of the shipping container;
support mounts connected to the laterally extending beams, the support mounts being positioned over the top of the shipping container;
a first set of longitudinal beams spanning between the support mounts at locations above the top of the shipping container;
a second set of longitudinal beams spanning between the laterally extending beams at locations to the sides of the shipping container; and
PV module support rails extending between the first and second sets of longitudinal beams, further comprising:
an L-shaped flange,
wherein the mounting support rails have groove therein and a bolt connection on the L-shaped flange connects the mounting support rail to the L-shaped flange.

15. The system of claim 1, wherein the module support rails are extruded sections of material having grooves therein.

16. A solar mounting system for a shipping container, comprising:
a shipping container;
laterally extending beams connected to the top of the shipping container, the laterally extending beams extending outwardly from top side edges of the shipping container;
support mounts connected to the laterally extending beams, the support mounts being positioned over the top of the shipping container;
a first set of longitudinal beams spanning between the support mounts at locations above the top of the shipping container;
a second set of longitudinal beams spanning between the laterally extending beams at locations to the sides of the shipping container;
PV module support rails extending between the first and second sets of longitudinal beams:
PV modules; and
PV module clamping systems connecting the PV modules to the PV module support rails, wherein the PV module clamping system comprises a bolt-type fastener secured to the edge of at least one PV module frame, and wherein the bolt-type fastener is also secured into a groove at the top of the module support rail.

17. The system of claim 16, wherein the bolt-type fastener is simultaneously secured to the edges of a pair of PV module frames, with one module frame on either side.

18. The system of claim 1, further comprising:
a plurality of laterally extending ground support mounted to the bottom of the shipping container.

* * * * *